United States Patent
AlSinan et al.

(10) Patent No.: US 12,486,765 B2
(45) Date of Patent: Dec. 2, 2025

(54) METHOD FOR EVALUATING ADVANCED CONFORMANCE CONTROL, SWEEP EFFICIENCY, DEEP DIVERSION, AND WATER SHUTOFF TREATMENTS

(71) Applicant: SAUDI ARABIAN OIL COMPANY, Dhahran (SA)

(72) Inventors: Marwah Mufid AlSinan, Al Qatif (SA); Abdulaziz S. Al-Qasim, Dammam (SA); Jun Gao, Dhahran (SA); Zuhair A. Yousif, Saihat (SA); Mustafa R. Satrawi, Anak (SA); Hyung Kwak, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 154 days.

(21) Appl. No.: 18/488,547

(22) Filed: Oct. 17, 2023

(65) Prior Publication Data
US 2025/0122802 A1    Apr. 17, 2025

(51) Int. Cl.
*G01N 24/08*    (2006.01)
*E21B 49/08*    (2006.01)

(52) U.S. Cl.
CPC ......... *E21B 49/088* (2013.01); *G01N 24/081* (2013.01)

(58) Field of Classification Search
CPC .......... G01V 3/32; G01V 3/14; G01R 33/448; G01R 33/3808; G01R 33/44;
(Continued)

(56) References Cited

U.S. PATENT DOCUMENTS 3,768,560 A    10/1973    Hill et al.
4,181,178 A    1/1980    Savins
(Continued)

FOREIGN PATENT DOCUMENTS

CA    2896222 A1    1/2016
CN    106050202 A    10/2016
(Continued)

OTHER PUBLICATIONS

Brattekås, Bergit et al. "New Insight from Visualization of Mobility Control for Enhanced Oil Recovery Using Polymer Gels and Foams". Oct. 19, 2016. Chemical Enhanced Oil Recovery (cEOR)—a Practical Overview (Year: 2016).*

(Continued)

*Primary Examiner* — Rishi R Patel
(74) *Attorney, Agent, or Firm* — Osha Bergman Watanabe & Burton LLP

(57) ABSTRACT

Described is a method for evaluating oil recovery. The method includes performing a pre-coreflood process, a coreflood process, and a post-coreflood process. The pre-coreflood process includes preparing heterogenous cores samples with different structural configurations. The coreflood process includes injecting a treatment into the core samples and obtaining nuclear magnetic resonance (NMR) measurements of the treated core samples. NMR measurements are compared to assess performance of the treatment. The post-coreflood process includes conducting an X-ray micro-computerized topography (CT) scan and a Saturate, Aromatic, Resin, and Asphaltene (SARA) analysis on the treated core samples.

16 Claims, 15 Drawing Sheets

(58) Field of Classification Search
CPC ..... G01R 33/445; G01R 33/46; E21B 49/088; E21B 43/16; G01N 24/081; G01N 24/08

See application file for complete search history.

(56) References Cited

U.S. PATENT DOCUMENTS

| | | | |
|---|---|---|---|
| 4,554,974 | A | 11/1985 | Kalpakci et al. |
| 4,844,163 | A | 7/1989 | Hazlett et al. |
| 4,921,576 | A | 5/1990 | Hurd |
| 5,762,141 | A | 6/1998 | Hutchins et al. |
| 7,040,390 | B2 | 5/2006 | Tubel et al. |
| 9,459,330 | B2 | 10/2016 | Freedman et al. |
| 9,804,062 | B2 | 10/2017 | Collins et al. |
| 2007/0142235 | A1 | 6/2007 | Berger et al. |
| 2014/0132258 | A1* | 5/2014 | Singer .................. E21B 49/00 324/303 |
| 2016/0168984 | A1 | 6/2016 | Fripp et al. |
| 2017/0081583 | A1 | 3/2017 | Han et al. |
| 2019/0186247 | A1 | 6/2019 | Lau et al. |
| 2019/0233712 | A1 | 8/2019 | Fathi Najafabadi et al. |
| 2019/0277122 | A1* | 9/2019 | Mahmoud ................ C09K 8/74 |
| 2020/0057172 | A1 | 2/2020 | Alharbi et al. |
| 2020/0172795 | A1 | 6/2020 | AlYousif et al. |

FOREIGN PATENT DOCUMENTS

| | | |
|---|---|---|
| CN | 111793489 A | 10/2020 |
| WO | 1986/000330 A1 | 1/1986 |

OTHER PUBLICATIONS

Friedmann, F., et al. "Development and testing of a foam-gel technology to improve conformance of the Rangely CO2 flood." SPE reservoir evaluation & engineering 2.01 (1999): 4-13. (Year: 1999).*

Vinci Technologies, "NMRFlood-NMR coreflood"; <https://www.vinci-technologies.com/rocks-and-fluids/special-core-analysis/nmr-experiments/nmrflood-nmr-coreflood/113452/>; Accessed Oct. 16, 2023 (3 pages).

Alshehri, Amar J. et al., "A Study of Gel-Based Conformance Control Within Fractured Carbonate Cores Using Low-Field Nuclear-Magnetic-Resonance Techniques"; SPE Reservoir Evaluation & Engineering; vol. 22, Issue 03, Paper No. SPE-187397-PA; pp. 1063-1074; Aug. 2019 (12 pages).

Kwak, Hyung Tae et al., "Close Monitoring of Gel Based Conformance Control by NMR Techniques"; Proceedings of the SPE Middle East Oil & Gas Show and Conference; Paper No. SPE-183719-MS; pp. 1-12; Mar. 6, 2017 (12 pages).

Aroonsri, Archawin et al., "Conditions for Generating Nanoparticle-Stabilized CO2 Foams in Fracture and Matrix Flow"; Proceedings of the SPE Annual Technical Conference and Exhibition; Paper No. SPE-166319-MS; pp. 1-19; Sep. 30, 2013 (19 pages).

Friedmann, François et al., "Experimental and Simulation Study of High-Temperature Foam Displacement in Porous Media"; SPE Reservoir Engineering; vol. 6, Issue 01, Paper No. SPE-17357-PA; pp. 37-45; Feb. 1991 (9 pages).

Forouzanfar, Fahim et al., "A two-stage well placement optimization method based on adjoint gradient"; Proceedings of the SPE Annual Technical Conference and Exhibition; Paper No. SPE-135304-MS; pp. 1-18; Sep. 19, 2010 (18 pages).

Lee, Hae Ok et al., "Laboratory Measurements of CO2-Foam Mobility"; SPE Reservoir Engineering; vol. 5, Issue 2, Paper No. SPE-17363-PA; pp. 193-197; May 1990 (5 pages).

Renkema, W.J. et al., "Success of SAG Foam Processes in Heterogeneous Reservoirs"; Proceedings of the SPE Annual Technical Conference and Exhibition; Paper No. SPE-110408-MS; pp. 1-28; Nov. 11, 2007 (28 pages).

Patton, J.T. et al., "Rheology of Mobility-Control Foams"; Society of Petroleum Engineers Journal; vol. 23, Issue 03, Paper No. SPE-9809-PA; pp. 456-460; Jun. 1983 (5 pages).

Tsau, Jyun-Syung et al., "Assessment of Foam Properties and Effectiveness in Mobility Reduction for CO2-Foam Floods"; Proceedings of the International Symposium on Oilfield Chemistry; Paper No. SPE-37221-MS; pp. 1-10; Feb. 18, 1997 (10 pages).

Buzi, Erjola et al., "Sensor Ball: An Autonomous Untethered Logging Platform"; Proceedings of the Offshore Technology Conference; Paper No. OTC-30538-MS; pp. 1-10; May 4, 2020 (10 pages).

San, Jingshan et al., "Nanoparticle-Stabilized Carbon Dioxide Foam Used in Enhanced Oil Recovery: Effect of Different Ions and Temperatures"; SPE Journal; vol. 22, Issue 05, Paper No. SPE-179628-PA; pp. 1416-1423; Oct. 2017 (8 pages).

Denney, Dennis, "Success of SAG-Foam Processes in Heterogeneous Reservoirs"; Journal of Petroleum Technology; vol. 60, Issue 01, Paper No. SPE-0108-0043-JPT; pp. 43-46; Jan. 2008 (3 pages).

Canbolat, Serhat et al., "Polymer gel conformance on oil recovery in fractured medium: Visualization and verification"; Journal of Petroleum Science and Engineering; vol. 182, Article 106289; pp. 1-16; Nov. 2019 (16 pages).

International Search Report and Written Opinion of the International Searching Authority issued Apr. 20, 2023 in corresponding International (PCT) Application No. PCT/US2022/052844, 12 pages.

* cited by examiner

| Sample | Foam Generation | NMR Measurements | Injection Sequence | Alternative Sample Configurations |
|---|---|---|---|---|
| • 7 cm long (*need to cut the Indiana samples into 2.75 inch long plugs*)<br>• 1.5 inch diameter<br>• 2 samples for each configuration & injection sequence | • pre-mixed foam | • dynamic NMR experiments | • Foam-Gel sequence<br>  • *injection from top*<br>  • *injection from bottom*<br>• Gel-Foam<br>  • *injection from top*<br>  • *injection from bottom*<br>• Foam-Gel<br>  • *injection from top*<br>  • *injection from bottom* |  1<br>If 1 does not work, try<br> 2<br>If 2 does not work, try<br> 3<br>If 1 does not work, try<br>    4<br>Face Dissolution<br>Conical Wormhole<br>Dominant Wormhole<br>Ramified Wormhole<br>Uniform Dissolution |
| If pre-mixed foam is not successful, try<br>• 7 inch or 12 inch long<br>• 1.5 inch diameter | • In-situ foam | • Static NMR | Same as before | Start from 1,2,3 then 4 |

FIG. 9

| Sample | Foam Generation | NMR Measurements | Injection Sequence | Alternative Sample Configurations |
|---|---|---|---|---|
| • 7 cm long<br>• 1.5 inch diameter<br>• 2 samples for each configuration & injection sequence | • pre-mixed foam | • dynamic NMR experiments | • Foam-Gel<br>  • injection from top<br>  • injection from bottom<br><br>• Gel-Foam<br>  • injection from top<br>  • injection from bottom<br><br>• Foam-Gel<br>  • injection from top<br>  • injection from bottom | 1 <br>2 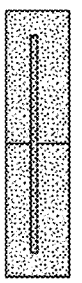<br>3 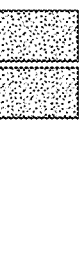<br>4 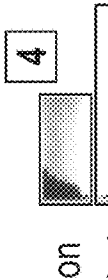<br>Face Dissolution<br>Conical Wormhole<br>Dominant Wormhole<br>Ramified Wormhole<br>Uniform Dissolution |
| • 30cm (12 inch) or 7 inch long<br>• 1.5 inch diameter | • In-situ foam | • Static NMR | Same as before | Start from 1,2,3 then 4 |

FIG. 10

| Sample | Foam Generation | NMR Measurements | Injection Sequence | Alternative Sample Configurations | |
|---|---|---|---|---|---|
| • 7 cm long<br>• 1.5 inch diameter<br>• 2 samples for each configuration & injection sequence | • pre-mixed foam | • dynamic NMR experiments | • Foam-Gel<br>  • injection from top<br>  • injection from bottom<br><br>• Gel-Foam<br>  • injection from top<br>  • injection from bottom<br><br>• Foam-Gel<br>  • injection from top<br>  • injection from bottom |  1<br> 2<br> 3<br> 4 | Face Dissolution<br>Conical Wormhole<br>Dominant Wormhole<br>Ramified Wormhole<br>Uniform Dissolution |
| Repeat previous experiment with live oil or dead filtered crude oil + toluene | | | | | |
| • 30cm long<br>• 1.5 inch diameter | • In-situ foam | • Static NMR | Same as before | Start from 1, 2, 3 then 4 | |
| Repeat previous experiment with live oil or dead filtered crude oil + toluene | | | | | |

FIG. 12

METHOD FOR EVALUATING ADVANCED CONFORMANCE CONTROL, SWEEP EFFICIENCY, DEEP DIVERSION, AND WATER SHUTOFF TREATMENTS

BACKGROUND

Heterogeneity in oil and gas reservoirs, such as fractures, faults, and thief zones, is one of the main challenges for efficient hydrocarbon recovery. As a result, different conformance control methods have been implemented to improve the sweep efficiency and conformance control of injected water or gas during improved oil recovery (IOR) and enhanced oil recovery (EOR) processes.

In SPE-183719-MS paper titled: "Close Monitoring of Gel Based Conformance Control by NMR Techniques", a workflow for evaluating gel potential in improving conformance control using advanced nuclear magnetic resonance techniques (NMR) was developed. However, gel treatments during gas injection for enhanced oil recovery may have challenges. Challenges may be related to unfavorable viscosity or mobility ratio. In addition, challenges may include gravity override within the reservoir due to density contrast between injectants and reservoir fluids, especially for miscible displacement cases.

Foams and gels are conventionally used to mitigate some of these challenges by increasing injectants, such as $CO_2$, increasing viscosity, and reducing mobility of foams and gels through the reservoir. However, stability degradation of foams and gels at reservoir conditions with time and distance may be a challenge.

Thus, there remains a need for evaluation of the use of foams and gels.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method for evaluating oil recovery. The method comprises performing a pre-coreflood process, a coreflood process, and a post-coreflood process. In the pre-coreflood process, a plurality of heterogenous core samples having different structural configurations are prepared. The coreflood process includes injecting a treatment into one or more of the heterogeneous core samples, resulting in a set of treated heterogeneous core samples. Nuclear magnetic resonance (NMR) measurements of the set of treated heterogeneous core samples are obtained. Then, the NMR measurements are compared to assess performance of the treatment. The post-coreflood process comprises conducting at least one of a post-coreflood X-ray micro-computerized topography (CT) scan and a Saturate, Aromatic, Resin, and Asphaltene (SARA) analysis on the set of treated heterogeneous core samples.

In another aspect, the plurality of heterogeneous core samples comprises a plurality of outcrop core-plugs.

In another aspect, the treatment comprises co-injecting a foam and a gel.

In another aspect, the treatment comprises alternate injecting of a foam and a gel.

In another aspect, the treatment is injected in a vertical direction.

In another aspect, the treatment is injected in a horizontal direction.

In another aspect, the pre-coreflood process further comprises selecting a plurality of homogeneous cores from an outcrop or a reservoir of interest.

In another aspect, the heterogeneous core samples are selected from the group consisting of samples with no fracture, samples with a drilled wormhole, samples with an artificial fracture, and samples with at least one acid wash wormhole, and combinations thereof.

In another aspect, the pre-coreflood process further comprises conducting a pre-coreflood X-ray micro-CT scan on at least one of the heterogeneous core samples prior to the coreflood process.

In another aspect, the post-coreflood process comprises conducting the post-coreflood X-ray micro-CT scan, the method further comprising comparing the pre-coreflood X-ray micro-CT scan to the post-coreflood X-ray micro-CT scan.

In another aspect, the post-coreflood process comprises conducting SARA analysis on effluent oil from the coreflood process.

In another aspect, a foam injection mode is determined and implemented during the coreflood process.

In another aspect, the NMR measurements comprise at least one of dynamic NMR measurements and static NMR measurements.

In another aspect, the coreflood process further comprises evaluating at least one of foam stability and gel stability.

In another aspect, the coreflood process further comprises evaluating an effect of the treatment on oil and gas recovery in the set of treated heterogeneous core samples.

In another aspect, evaluating the effect of the treatment comprises determining at least one of an original oil in core (OOIC) value, a remaining oil in core (ROIC) value, and an oil recovery by waterflooding (ORWF) value.

Other aspects and advantages of the claimed subject matter will be apparent from the following description and the appended claims.

BRIEF DESCRIPTION OF DRAWINGS

FIG. 9 illustrates a summary of validation experiment specifications according to one or more embodiments of the present disclosure.

FIG. 10 illustrates a summary of stability experiment specifications according to one or more embodiments of the present disclosure.

FIG. 12 illustrates a summary of recovery experiment specifications according to one or more embodiments of the present disclosure.

DETAILED DESCRIPTION

In one aspect, embodiments disclosed herein relate to a robust workflow for estimating oil recovery by evaluating sweep efficiency and conformance control for gel-foam combinations. Sweep efficiency is a measure of the effectiveness of an enhanced oil recovery process that depends on the volume of the reservoir contacted by the injected fluid. Specifically, the volumetric sweep efficiency is an overall result that depends on the injection pattern selected, areal, and vertical heterogeneities, such as fractures and large permeability variation in the reservoir, mobility ratio between the displacing and the displaced fluid, and flow rate. Conformance control refers to reservoir engineering practices to maintain the uniformity of the flooding front in order to optimize the sweep efficiency. For example, adding a polymer to the injected water in a high viscosity oil reservoir is a manner of conformance control. Since the polymer increases the viscosity of injected water, the result is more uniform flooding front and a reduction in the formation of viscous fingers at the flooding front.

In one or more embodiments, the workflow for estimating oil recovery includes one or more of evaluating water shutoff treatment and deep diversion treatment. Water shutoff treatments are chemical or mechanical methods to close off the zones intersecting the wellbore, which are contributing to high water production of the well. An example of a mechanical method of water shutoff treatment is placing a steal casing in the water zone. Injecting gel in a fracture that is intersecting the wellbore and is responsible for high water production is an example of a chemical method of water shutoff treatment. Deep diversion treatments are attempts to extend water shutoff treatments to a further distance in the reservoir, such as beyond the near wellbore region.

Figure 1:
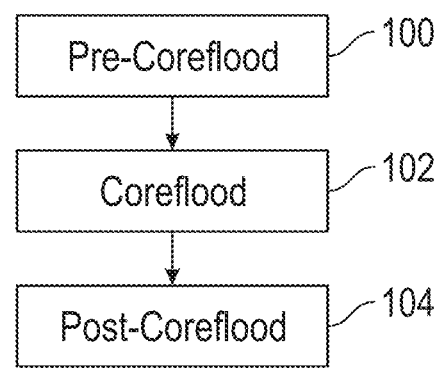
FIG. 1 illustrates a workflow consisting of pre-coreflood, coreflood, and post-coreflood experiments according to one or more embodiments of the present disclosure.

As shown in FIG. 1, the workflow according to one or more embodiments of the present disclosure consists of three main processes: a pre-coreflood process 100, coreflood process 102, and post-coreflood process 104. The pre-coreflood process 100 involves sample preparation and initial measurements. The coreflood process 102 consists of three different types of corefloods to effectively evaluate the conformance control treatment. The coreflood process 102 includes validation experiments, stability in reservoir porous media experiments, and oil recovery estimating experiments to estimate the effectiveness of treatments. Finally, the post-coreflood process 104 involves additional measurements to reduce the uncertainty. Each of these processes is described in detail below.

(1) Pre-Coreflood Process

Figure 2:
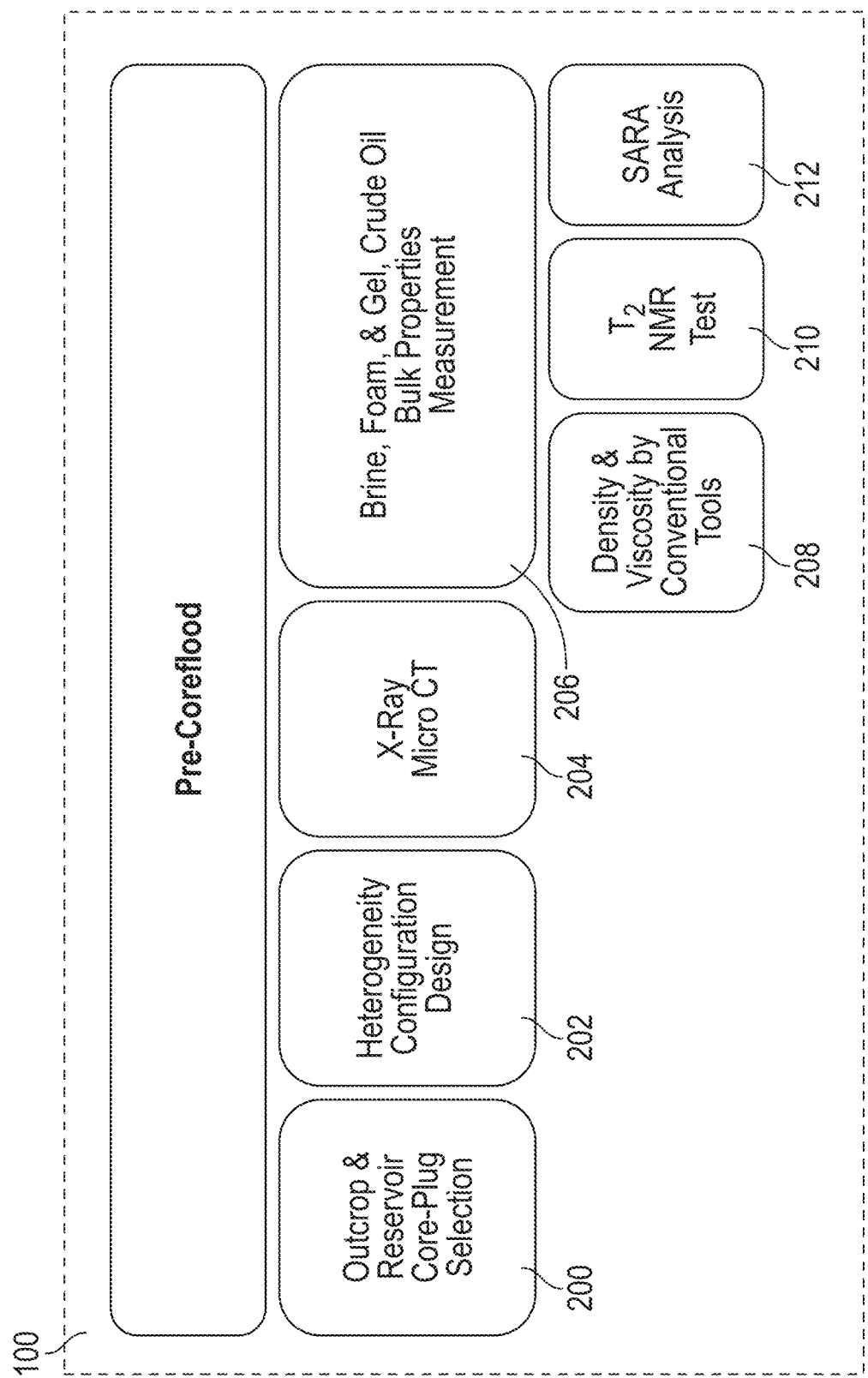
FIG. 2 illustrates pre-coreflood processes according to one or more embodiments of the present disclosure.

FIG. 2 shows exemplary experiments and procedures of the pre-coreflood process 100 according to one or more embodiments of the present disclosure. In an outcrop and reservoir core-plug selection step 200, a group of core-plugs is selected from outcrops or a reservoir of interest. Outcrops are rock formations accessible from the surface. Non-limiting examples of outcrop core-plugs include Indiana limestone and bentheimer sandstone. Selected core-plugs are of homogenous texture with no damage or fractures. Additionally, the outcrop samples selected desirably have similar porosity, permeability, and lithology (minerology) to the reservoir outcrops. A medical X-ray computerized topography (CT) scan or X-ray micro-computerized topography (CT) scan may be conducted to confirm lack of damage in the selected samples.

Figure 3:
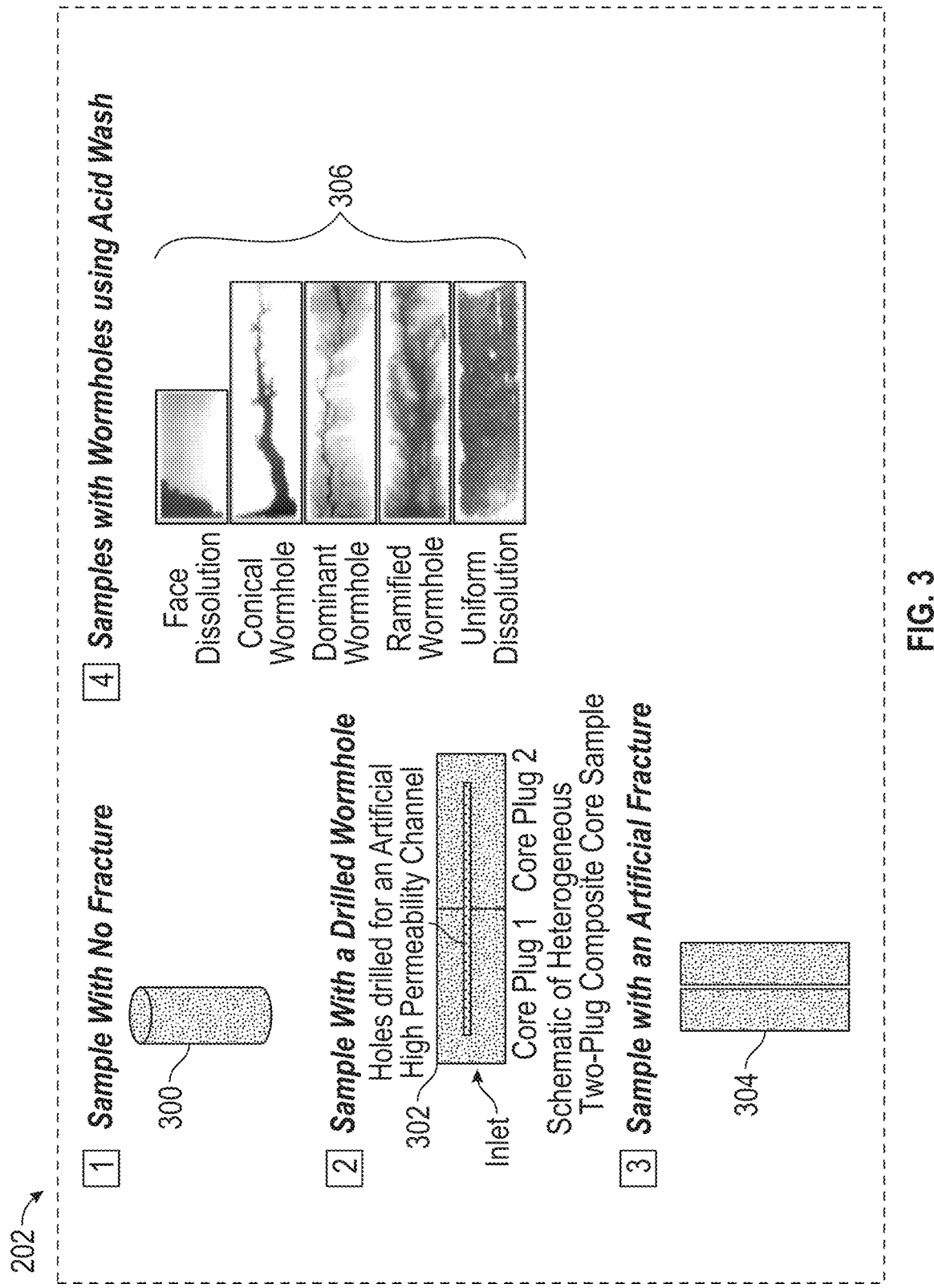
FIG. 3 illustrates core-plug configurations according to one or more embodiments of the present disclosure.

In a heterogeneity configuration design step 202, four different configurations are created to study the impact of different fractures and wormhole geometry on the gel-foam treatment. The configurations are ordered starting with the simplest heterogeneity in order to eliminate unsuccessful cases. FIG. 3 illustrates core-plug configurations according to one or more embodiments of the present disclosure. In terms of increasing fracture or wormhole complexity, the configurations are the following. The first configuration 300 is a homogeneous sample with no fracture. The first configuration 300 is a base sample against which other configuration samples are compared. The second configuration 302 is a sample with a drilled wormhole. To prepare the second configuration 302, which is a heterogeneous composite sample, small holes (around 3.5 to 4.0 mm or ⅒ of the core) are drilled into two similar core-plugs. The two plugs are joined, as depicted in FIG. 3, to form a heterogeneous composite sample for oil recovery and conformance evaluations.

Figure 4:
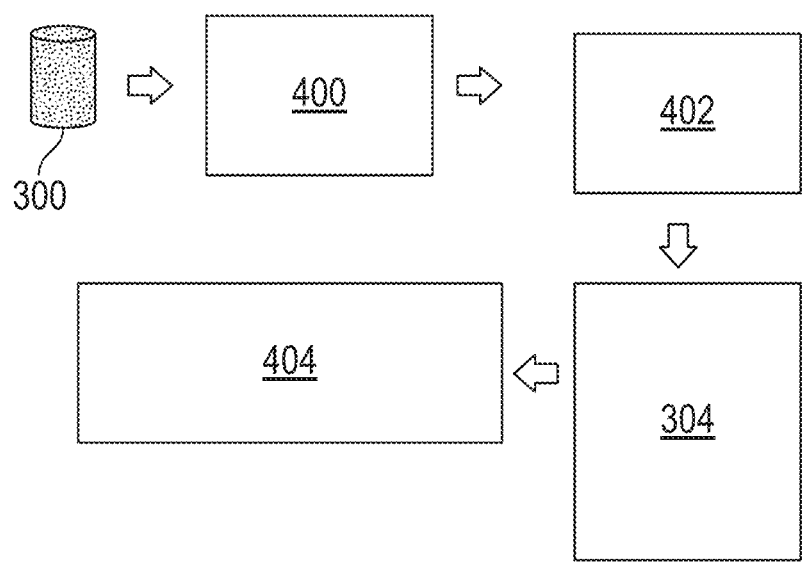
FIG. 4 illustrates a workflow to create a core-plug configuration according to one or more embodiments of the present disclosure.

The third configuration 304 is a sample with an artificial fracture. FIG. 4 shows the workflow to create the third configuration 304. After obtaining a homogeneous core plug, which corresponds to the first configuration 300, a fracture may be created with a saw or the Brazilian splitting method in step 400. As understood by one skilled in the art, the Brazilian splitting method involves applying a load on a sample (e.g., core plug) to induce opening of a vertical fracture in the sample. In step 402, the fractured core plug is sanded with sandpaper to normalize the roughness of the surface of the fractured core plug. In step 404, an x-ray and surface roughness measurement is conducted.

Referring again to FIG. 3, the fourth configuration 306 is prepared using an acid wash to create at least one wormhole. Acid wash may create face dissolution, conical wormholes, dominant wormholes, ramified wormholes, and uniform dissolution. Since acid wash is known to result in different wormhole configurations, all of the configurations shown in FIG. 3 are used to widen the scope of the study.

Referring to FIG. 2, in an X-ray micro-CT scan step 204, an X-ray micro-CT scan is conducted on each of the samples to establish base cases. The obtained images may be compared with the X-ray micro-CT scan taken post-coreflood to assess performance of later treatment and reduce uncertainty in the analysis.

In an initial brine, foam, gel, and crude oil bulk properties measurement step 206, at least one property of each fluid to be used in later calculations and analysis may be measured. For instance, density and viscosity may be measured by conventional tools 208, such as a density and viscosity meter. Additionally, a T2 nuclear magnetic resonance (NMR) test 210 may be performed. The T2 log mean values may be used to identify the bulk fluids in the NMR tests that will be conducted during the coreflood process 102. Furthermore, SARA (Saturate, Aromatic, Resin and Asphaltene) analysis 212 may be performed on the crude oil prior to injection in order to evaluate changes in oil composition in the coreflood experiments. SARA analysis 212 may be conducted by performing a scan that combines thin-layer chromatography with a flame ionization detection.

(2) Coreflood Process

In a first set of experiments, a pre-mixed foam is used, and dynamic NMR experiments (described below) with 2 MHZ (megahertz) NMR are conducted. Initially, the first configuration of core-plug sample is used. In some tests, a foam-gel sequence is injected from the top of the core-plug. In other tests, a foam-gel sequence is injected from the bottom of the core-plug. Since gel and foam have different buoyancies, different spatial displacements will result.

If the first core-plug configuration does not work, experiments are performed with the second configuration of core-plug. For example, if the injected fluid is trapped at the entrance of the core-plug, subsequent injection steps are prevented due to high entrance pressure in the core-plug sample. If the second configuration does not work, experiments are performed using the third configuration. If the third configuration does not work, experiments are performed on the fourth configuration. The experiments performed on each of the second, third, and fourth configurations include dynamic NMR experiments. Each of the second, third, and fourth configurations are subjected to a gel-foam sequence injected from the top and the bottom. Additionally, each of the second, third, and fourth configurations are subjected to a foam-gel sequence injected from the top and the bottom.

If injection of pre-mixed foam is not possible due to high injection pressure, experiments may be performed with in-situ foam in a second set of experiments. These experiments include static NMR experiments (described below). The sequence of core-plug configurations and the sequences of foam and gel injection treatments are the same as described for the first set of experiments.

In one embodiment, a 2 MHz NMR coreflood is performed with the core-plug positioned in a vertical position. In this embodiment, the conditions for performing the experiment includes a temperature from approximately 90° C. to approximately 100° C., such as 95° C.; a confining pressure from about 1200 pounds per square inch (psi) to about 1600 psi, such as 1400 psi; and a back pressure from approximately 150 psi to approximately 250 psi, such as 200 psi.

In another embodiment, a high pressure and high temperature coreflood equipment with no NMR scanning capabilities is utilized and the core-plug is positioned horizontally unlike the vertical position in the NMR. For in-situ foam generation, the optimal length of the core-plug (or a composite of core-plugs) is around 30 cm (12 inch) or approximately 7 inches.

Figure 5:
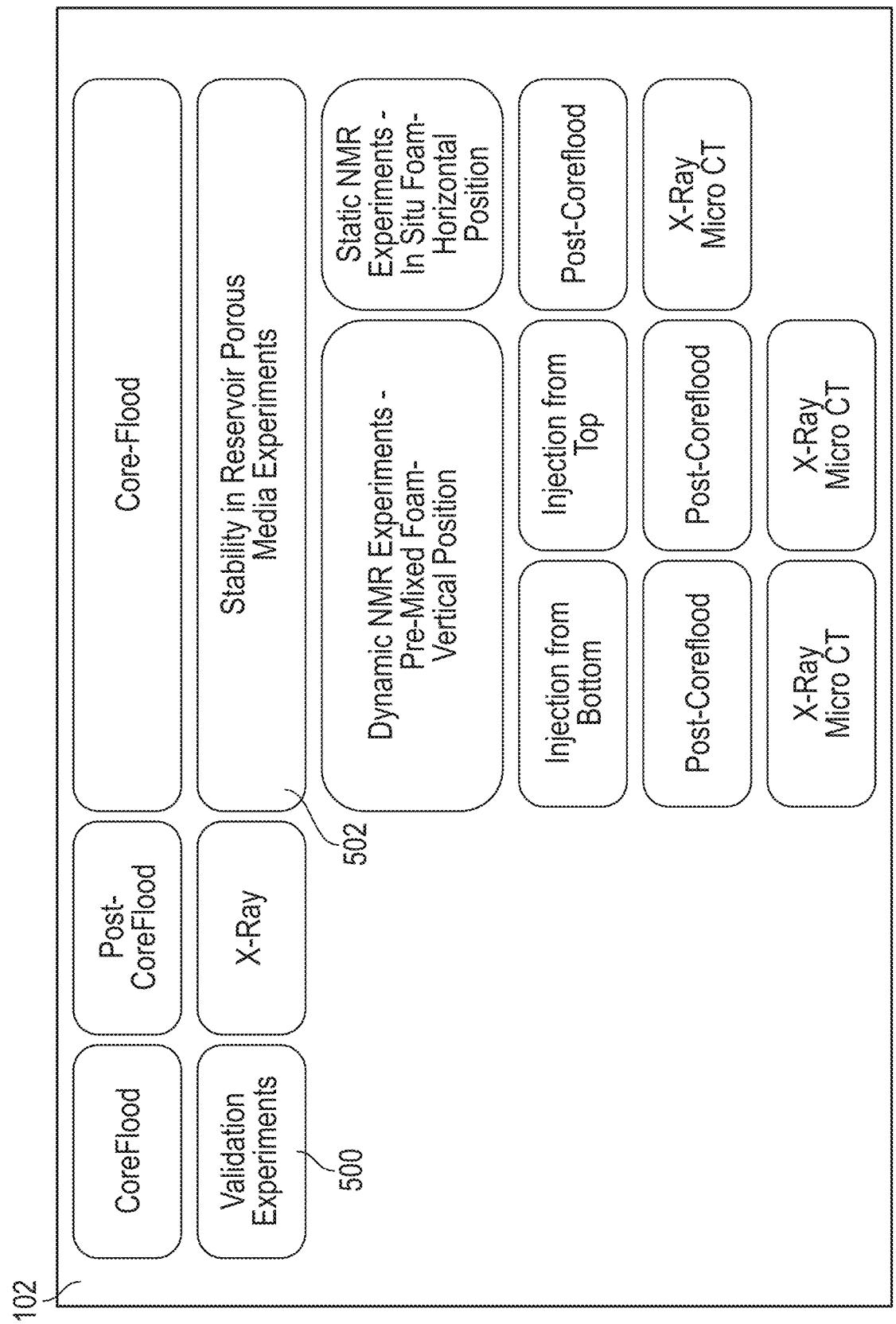
FIG. 5 illustrates coreflood processes according to one or more embodiments of the present disclosure.

FIG. 5 shows exemplary experiments involved in the coreflood process 102. The coreflood experiments may include validation experiments 500, foam and gel stability experiments 502, and oil recovery experiments. The validation experiments 500 may be performed to avoid wasting costly reservoir core-plugs. Rather, outcrop rocks, such as Indiana Limestone, are used to determine final sample configurations and an injection sequence (i.e., gel-foam vs. foam-gel) for the study. Validation experiments 500 may also include experiments for determining the feasibility of injecting pre-mixed foam and qualitative evaluation of foam and gel stability in porous media.

In one or more embodiments, samples having specifications that are close to those of conventional oil reservoirs may be obtained. A sample number of from about 1 to about 2 for each injection sequence and sample configuration may be used. The samples may have a porosity of 15-20%, 135-220 millidarcies (mD). The samples may have a diameter of from about 1 inch to about 2 inches, such as approximately 1.5 inches, and a length of from about 7 inches to about 14 inches, such as approximately 8 inches. In some embodiments, the brine used is $D_2O$ (deuterium oxide, $2H_2O$) sea water having a salinity of 57,612 total dissolved solids (TDS). The gel used in experiments may include sulfonated polyacrylaminde, Cr (III) crosslinker, and sea water. The gel volume may have a pore volume of from about 0.1 to about 0.5 of the pore volume in the core-plug. The gel may include polymer in an amount from about 3000 to about 5000 milligrams/liter (mg/L), such as 4000 mg/L, and Cr (III) solution in amount from about 50 to about 200 mg/L, such as 100 mg/L. The foam may include an amount of amphosol LB (lauramidopropyl betaine) surfactant from about 0.1 to about 0.5, nitrogen or $CO_2$ gas, and sea water having a salinity of approximately 57,612 TDS.

Since hydrogen (1H) may be monitored during $T_2$ NMR tests, $D_2O$ may be used to create the brine, while $H_2O$ may be used to create the gel and foam. Therefore, only the gel and foam movements may be tracked and distinguished during the NMR test, which is useful for reducing the uncertainty of the spatial distribution of the fluid in the sample. Nitrogen is used to create the foam if the wetted parts of the core-flood equipment are susceptible to corrosion from $CO_2$. If $D_2O$ is not available or of low purity (contaminated with 1H), $^{23}Na^+$ (Sodium) NMR scanning may be used instead of 1H NMR scanning, where the response of the sodium ions in brine, gel and foam is monitored.

In one or more embodiments of the validation experiments 500, two samples for each configuration and injection sequence are used. The samples may be range in length from approximately 1 inch to approximately 15 inches, such as 2.75 inches or 12 inches. The samples may have a diameter from approximately 1 inch to approximately 3 inches, such as 1.5 inches. There may be two foam injection modes: pre-mixed foam and in-situ foam. With pre-mixed foam, the foam is formed prior to coreflood and uploaded into a piston accumulator. With in-situ foam, the foam is generated in the core-plugs during injection. This can be done in at least two ways: by injecting all the components together or by alternative injection of surfactant slugs and gas ($CO_2$ or $N_2$).

Figure 6:
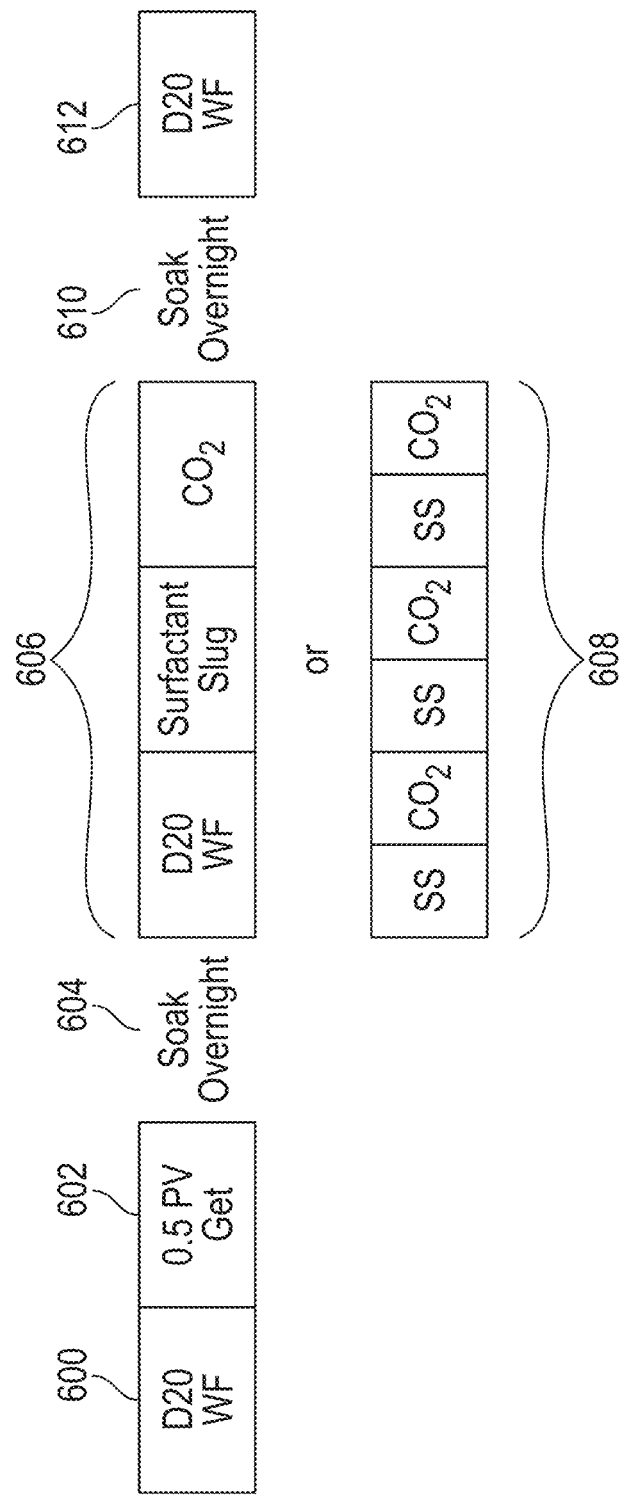
FIG. 6 illustrates an injection sequence and alternative methods to generate in-situ foam according to one or more embodiments of the present disclosure.

FIG. 6 is a schematic showing an injection sequence and two alternative methods to generate in-situ foam. In step 600, waterflooding (WF) of samples is performed with $D_2O$ water. In step 602, a gel of approximately 0.5 pore volume (PV) is injected into samples. Samples are soaked overnight in step 604. In a first method 606 of generating in-situ foam, a sequence containing one slug of each mixture of $D_2O$ water, a surfactant slug, and gas ($CO_2$) are injected into samples. In a second method 608, the same gas ($CO_2$) and surfactant slugs (SS) may be divided into several smaller slugs (e.g., 2 to 12 slugs) and alternately injected in order to improve the mixing, as illustrated in FIG. 6. Following generation of the in-situ foam by either method, the samples are again soaked overnight in step 610. Finally, in step 612, the samples are waterflooded with $D_2O$ water.

Dynamic NMR

Figure 7:
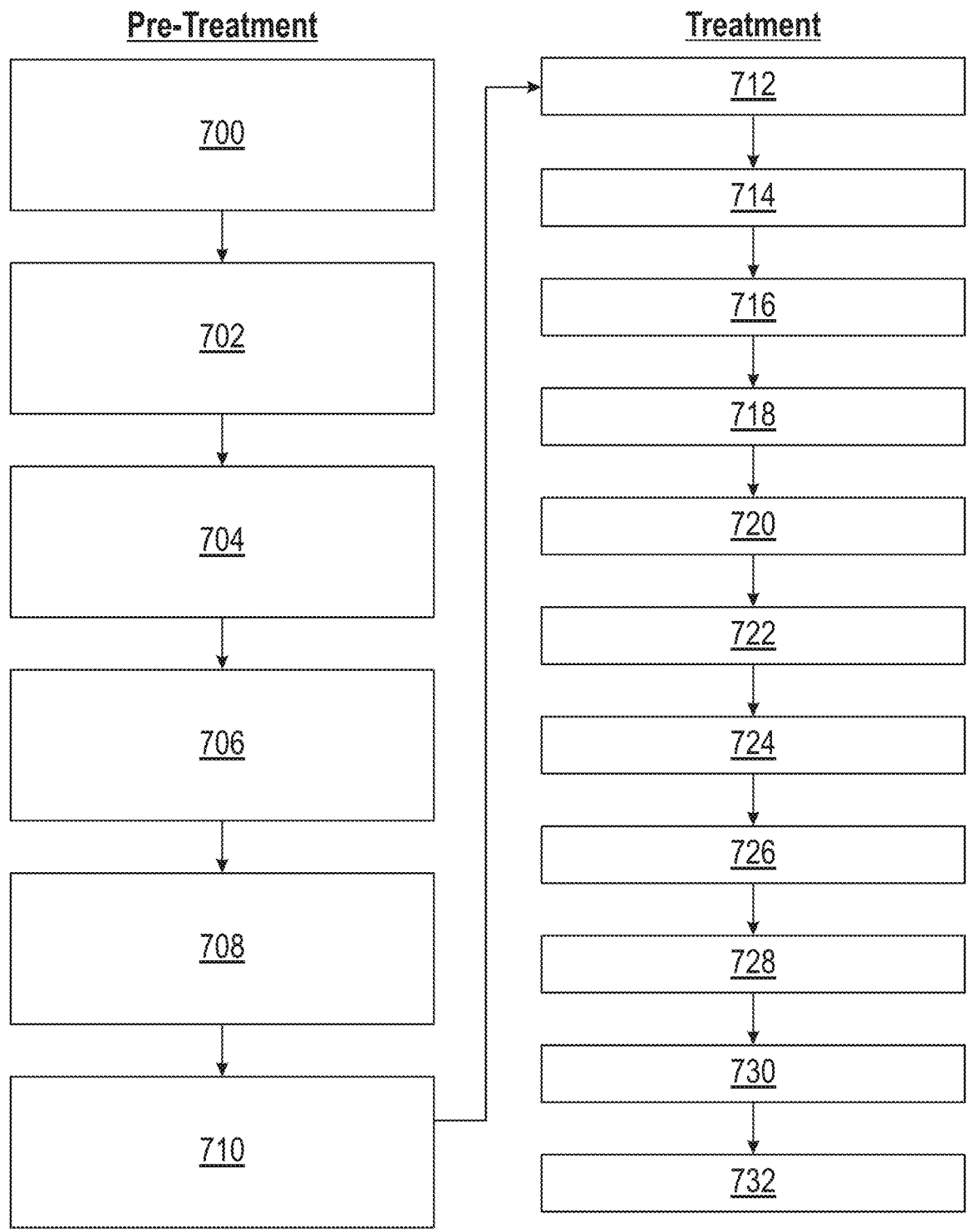
FIG. 7 illustrates an experimental workflow for the validation experiments using NMR coreflood, dynamic NMR measurements, ex-situ foam, and core-plug in vertical position according to one or more embodiments of the present disclosure.

FIG. 7 depicts the workflow for validation experiments using NMR coreflood, dynamic NMR measurements, ex-situ foam (i.e., foam prepared outside the core-plug), and core-plug in a vertical position. In the context of these experiments, NMR means that a $T_2$ NMR and brine profile tests are performed at static flow conditions (no injection). On the other hand, dynamic NMR includes the same tests as NMR while actively injecting.

The initial series of steps is a pre-treatment sequence. In block 700, the samples are fully saturated with H20 Arab-D brine. In block 702, a first NMR is conducted. In block 704, the samples are desaturated and dried in the oven. In block 706, a second NMR is conducted. In block 708, the samples are fully saturated with $D_2O$ brine. In block 710, a third NMR is conducted.

The subsequent series of steps is a treatment sequence, which results in a set of treated heterogeneous core samples. In block 712, gel having 0.5 PV is injected into samples. In block 714, a first dynamic NMR is performed on the samples. In block 716, the samples are soaked overnight. In block 718, 2-3 pore volumes (PV) of $D_2O$ are injected into the sample, or waterflood (WF). In block 720, a first NMR is conducted on the samples. In block 722, foam injection is performed. In block 724, a second dynamic NMR is performed on the samples. In block 726, the samples are again soaked overnight. In block 728, 2-3 PV of $D_2O$ are injected into the sample. In block 730, a third NMR is conducted on the samples. In block 732, the experiment is repeated while injecting from the top of the sample.

Figure 8:
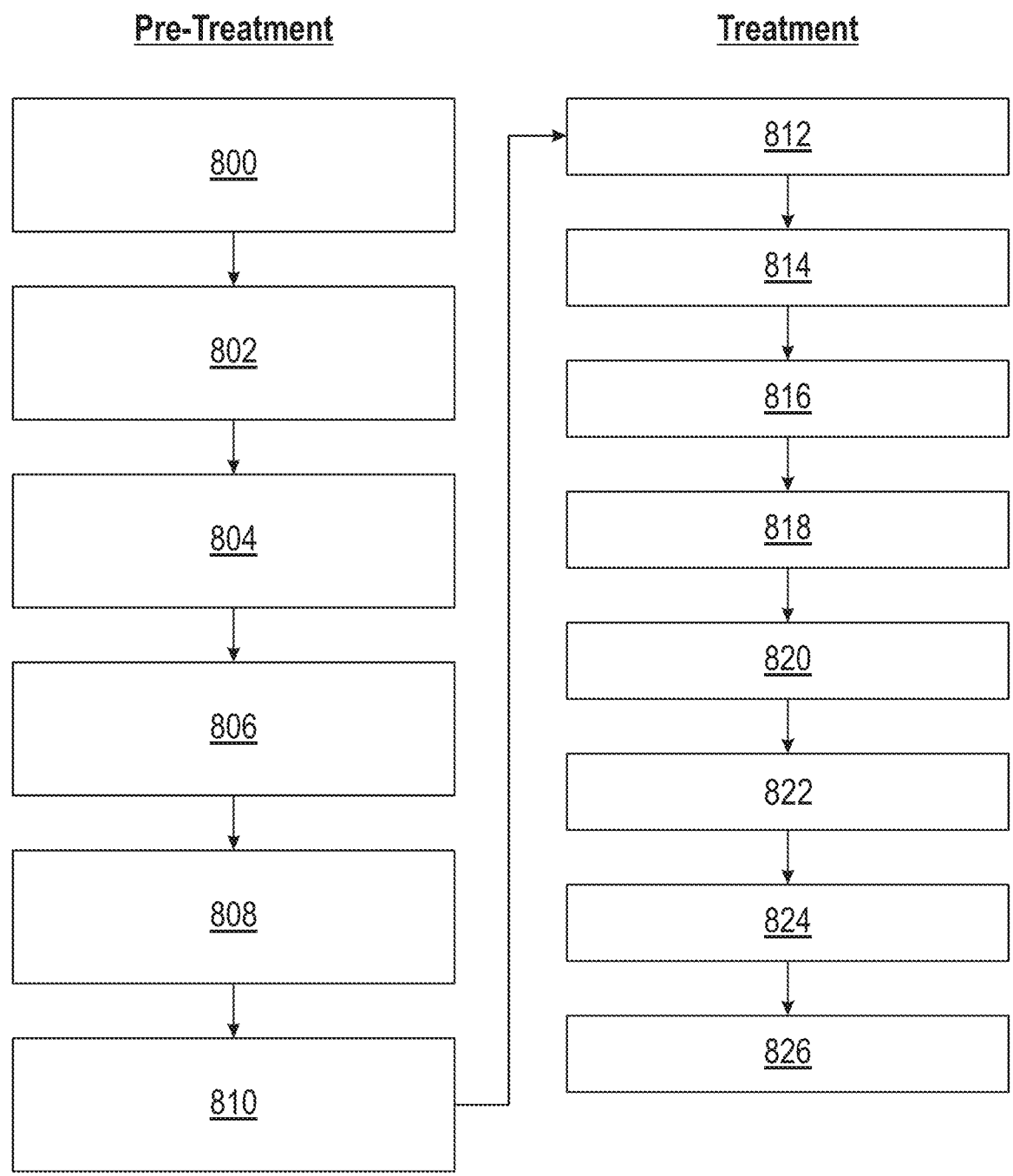
FIG. 8 illustrates an experimental workflow for the validation experiments using regular coreflood, static NMR measurements, in-situ foam, and core-plug in horizontal position according to one or more embodiments of the present disclosure.

Since a coreflood with NMR scanning capabilities is used, static NMR tests may be utilized. Specifically, when NMR tests are required, the sample will be taken to NMR spectroscopy to conduct the required tests before returning it to the regular coreflood equipment. FIG. 8 depicts an experimental workflow for the validation experiments using regular coreflood, static NMR measurements, in-situ foam, and core-plug in a horizontal position. As with the dynamic NMR workflow, in the context of these experiments, NMR means that a $T_2$ NMR and brine profile tests are performed at static flow conditions (no injection).

Static NMR

As with the dynamic NMR workflow, there is a pre-treatment sequence and a treatment sequence. Referring to the pre-treatment sequence, in block 800, the samples are fully saturated with $H_2O$ Arab-D brine. In block 802, a first NMR is conducted. In block 804, the samples are desaturated and dried in the oven. In block 806, a second NMR is conducted. In block 808, the samples are fully saturated with $D_2O$ brine. In block 810, a third NMR is conducted.

Referring to the treatment sequence, in block 812, 0.5 PV gel injection is performed. In block 814, the samples are soaked overnight. In block 816, 2-3 PV $D_2O$ WF. In block 818, a first NMR is conducted. In block 820, foam injection is performed. In block 822, the samples are again soaked overnight. In block 824, 2-3 PV $D_2O$ WF. In block 826, a second NMR is conducted.

FIG. 9 is a table of validation experiments and sample specifications, illustrating validation experiments and sample specifications as described in detail above. In the coreflood process, foam stability, gel stability, and compatibility with reservoir porous media (e.g., reservoir rock, reservoir matrix) are evaluated. Compatibility between the injected fluid and the resident fluids in the reservoir is measured in terms of surfactant precipitation, salt deposition, and foam and gel decomposition. Core-plugs are taken from an oil and gas reservoir of interest. The brine and chemicals used in the experiments are the same as the ones used in the validation experiments.

FIG. 10 is a table of stability experiments and sample specifications. Note that all experiments illustrated in FIG. 10 are the same as in the validation experiments illustrated in FIG. 9. However, in the stability experiments illustrated in FIG. 10, all of the experiments in the two rows of the table are required. In addition, the sample configuration might change depending on the results of the validation study.

Recovery Experimental Workflow

In one or more embodiments, an objective of a recovery experimental workflow is to evaluate the effect of foam and gel treatment on oil and gas recovery in the cores. The evaluation may be extrapolated to estimate the effectiveness of treatment on oil and gas recovery in an oil field. To compare improvements from the method described herein over conventional methods, an improved recovery factor (IRF) measurement may be used. For example, to compare improvement from gel-foam injection over waterflooding alone, the incremental oil recovery can be expressed with reference to original oil in core (OOIC), remaining oil in core (ROIC), and oil recovery by waterflooding (ORWF) in core, which are defined as:

$$RF_{Post-gel} = \frac{S_{oi} - S_o(\text{Post-gel})}{S_{oi}},$$

$$IRF \% \text{ of } OOIC = RF_{Post-gel} - RF_{Post-WF},$$

$$IRF \% \text{ of } ROIC = \frac{\% \text{ of } OOIC}{(100 - RF_{Post-WF})} \times 100, \text{ and}$$

$$IRF \% \text{ } ORWF = \frac{\% \text{ of } OOIC}{RF_{Post-WF}},$$

where gel refers to a gel and foam combined treatment, RF denotes recovery factor, and $S_{oi}$ denotes the initial oil saturation. Post-WF is the oil saturation after the initial waterflood, Post-gel is the oil saturation after the gel treatment, and IRF is the incremental recovery factor. After calculating, the values may be put in tables or charts to compare improvements from different treatments.

Figure 11:
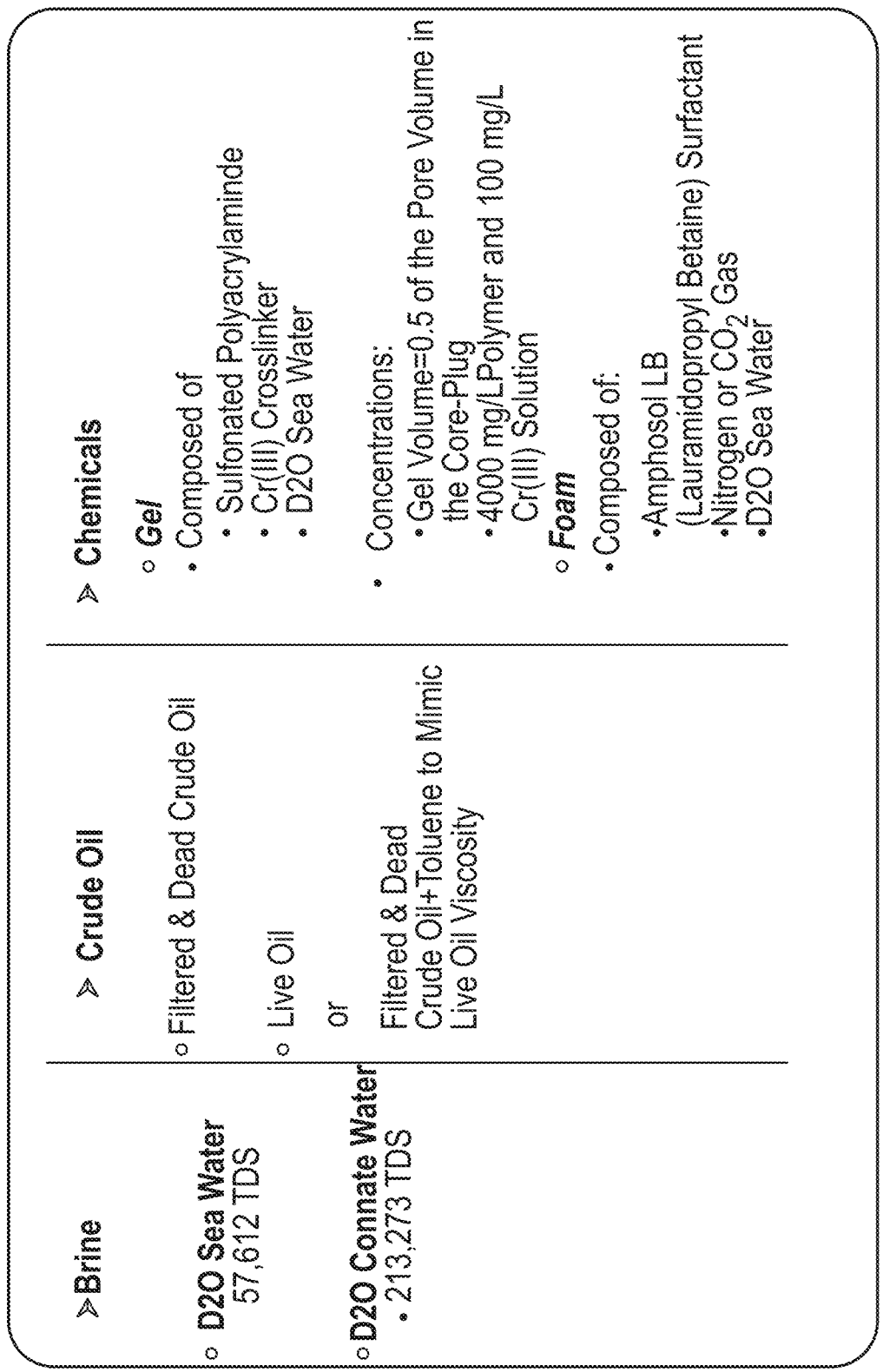
FIG. 11 illustrates specifications of fluids used in recovery experiments according to one or more embodiments of the present disclosure.

FIG. 11 is a table listing examples of brines, crude oils, and chemicals and their concentrations used in oil recovery experiments. For the crude oil, the experiments are conducted with filtered and dead crude oil first for safety reasons. Then, the experiments are conducted with live oil. If live oil is not available, a mix of toluene and dead filtered oil, which can mimic the lower viscosity of live oil, may be used.

FIG. 12 is a summary of experiments in the oil recovery process along with examples of sample specifications. Note that the final sample configuration will depend on the results of the validation study. In this workflow, there is a gas injection step ($CO_2$ or $N_2$) before foam injection in order to improve oil recovery. Further, if $D_2O$ is not of high purity, it is suggested that all the NMR steps following an oil imbibition step include T2D (T2—Diffusion) NMR test in addition to T2 NMR and brine profile tests in order to reduce uncertainty in separating oil and water response. The oil imbibition step is a step in oil recovery experiments, specifically in the pre-treatment sequence, such as block 1312 described below.

Figure 13:
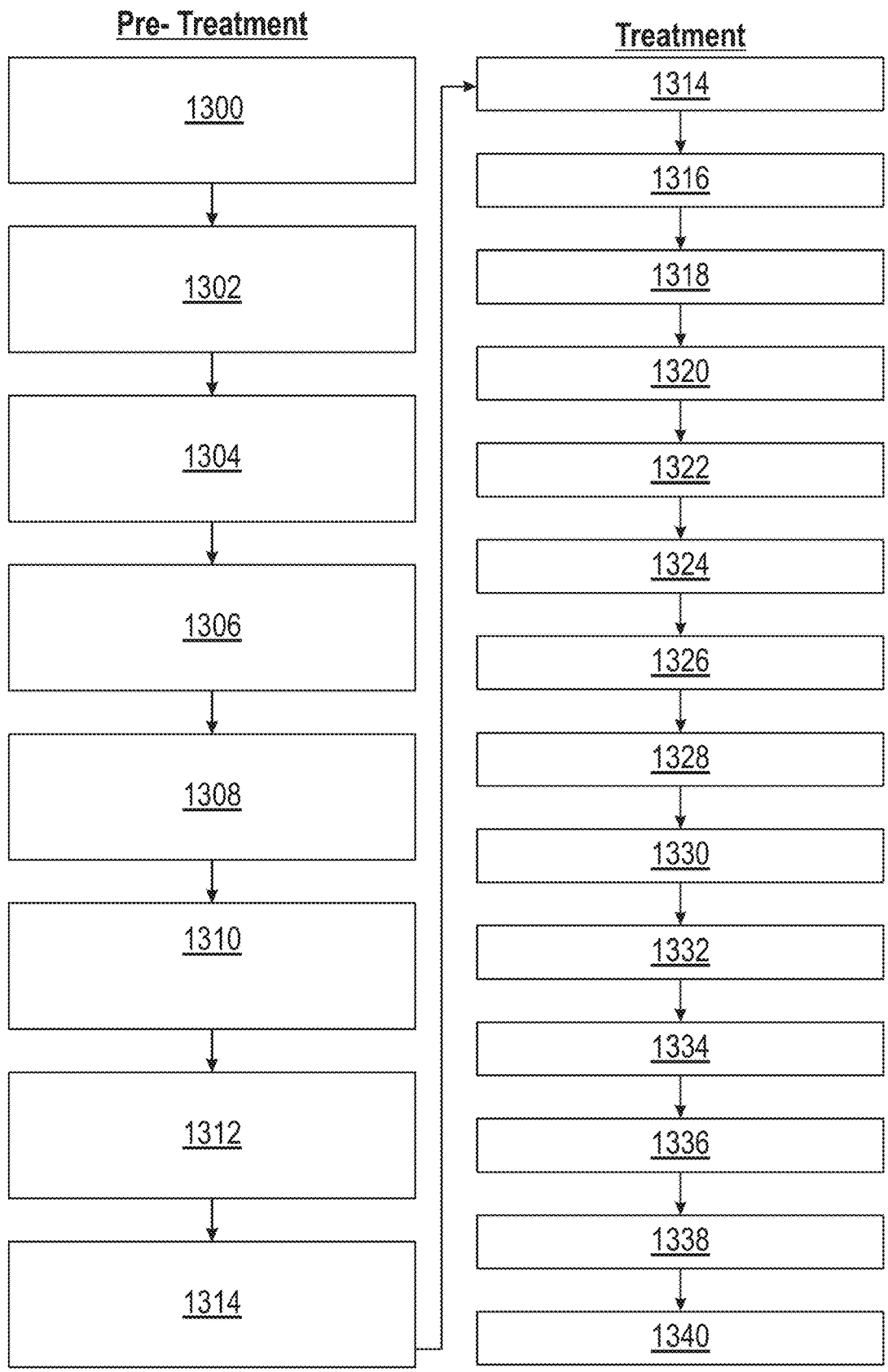
FIG. 13 illustrates an experimental workflow for the recovery experiments using NMR coreflood, dynamic NMR measurements, ex-situ foam, and core-plug in vertical position according to one or more embodiments of the present disclosure.

FIG. 13 illustrates the experimental workflow for the recovery experiments using NMR coreflood, dynamic NMR measurements, ex-situ foam, and core-plug in vertical position. The initial series of steps is a pre-treatment sequence. In block 1300, the samples are fully saturated with $H_2O$ Arab-D brine. In block 1302, a first pre-treatment NMR is conducted. In block 1304, the samples are desaturated and dried in the oven. In block 1306, a second pre-treatment NMR is conducted. In block 1308, the samples are fully saturated with $D_2O$ brine. In block 1310, a third pre-treatment NMR is conducted. Spontaneous inhibition and aging followed by force drainage with dead oil is performed in block 1312. Finally, a fourth pre-treatment NMR is conducted in block 1314.

The subsequent series of steps is a treatment sequence. In block 1316, the samples are flooded with $D_2O$ brine. Then, a first treatment NMR is performed in block 1318. In block 1320, gel having 0.5 PV is injected into samples. In block 1322, a first dynamic NMR is performed on the samples. In block 1324, the samples are again flooded with $D_2O$ brine. A second treatment NMR is performed in block 1326. In block 1328, gas is injected into the samples. A third treatment NMR is performed in block 1330. Foam is injected into the samples in block 1332. In block 1334, a second dynamic NMR is performed on the samples. A $D_2O$ brine waterflood is conducted until oil production is negligible in block 1336. A fourth treatment NMR is performed in block 1338. The experiment is repeated while injecting from the top of the sample, as represented by block 1340.

Figure 14:
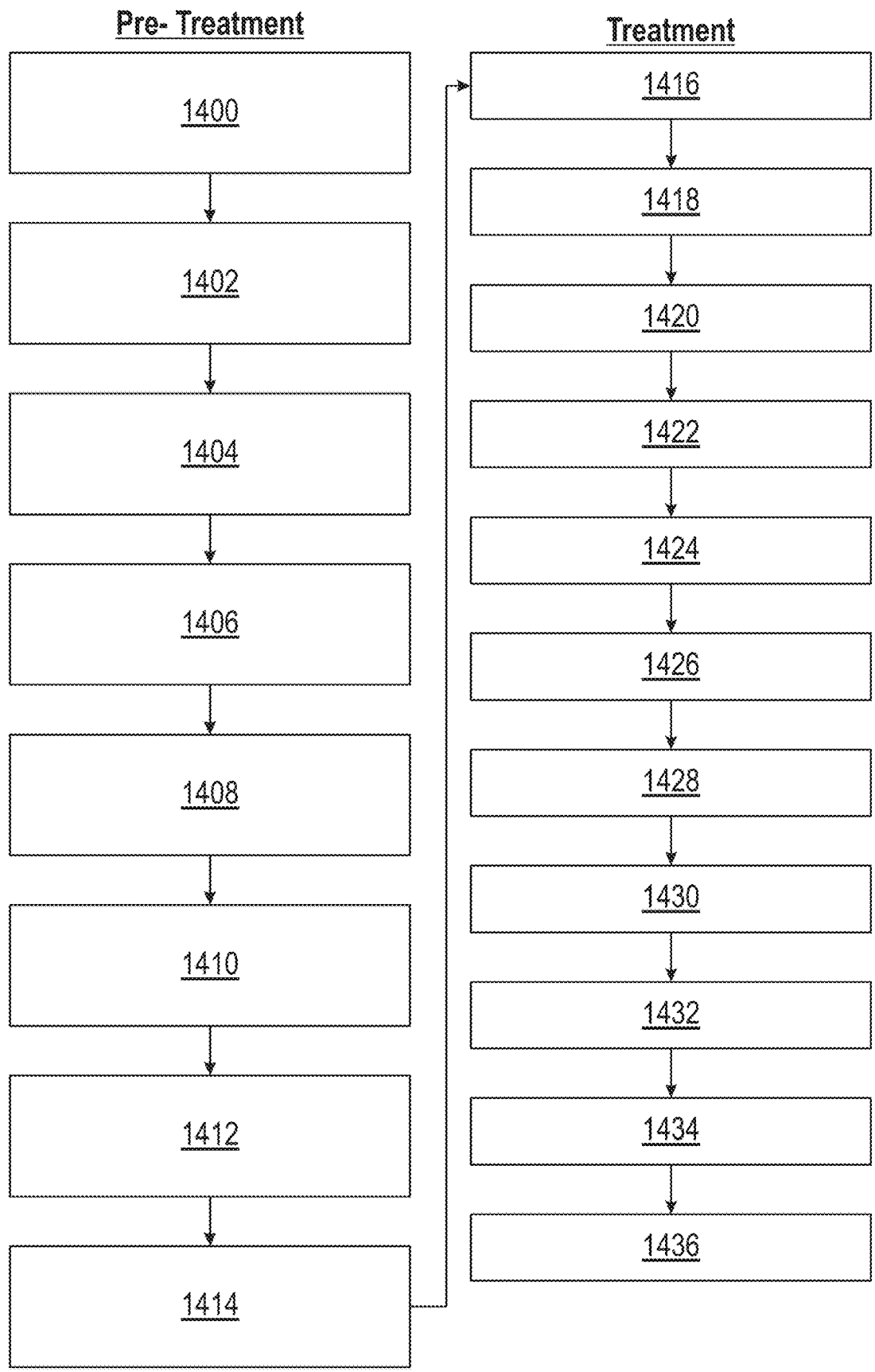
FIG. 14 illustrates an experimental workflow for the recovery experiments using regular coreflood, static NMR measurements, in-situ foam, and core-plug in horizontal position according to one or more embodiments of the present disclosure

FIG. 14 illustrates the experimental workflow for the recovery experiments using regular coreflood, static NMR measurements, in-situ foam, and core-plug in horizontal position. The initial series of steps is a pre-treatment sequence. In block 1400, the samples are fully saturated with $H_2O$ Arab-D brine. In block 1402, a first pre-treatment NMR is conducted. In block 1404, the samples are desaturated and dried in the oven. In block 1406, a second pre-treatment NMR is conducted. In block 1408, the samples are fully saturated with $D_2O$ brine. In block 1410, a third pre-treatment NMR is conducted. Spontaneous inhibition and aging followed by force drainage with dead oil is performed in block 1412. Finally, a fourth pre-treatment NMR is conducted in block 1414.

The subsequent series of steps is a treatment sequence. In block 1416, the samples are flooded with $D_2O$ brine. Then, a first treatment NMR is performed in block 1418. In block 1420, gel having 0.5 PV is injected into samples. In block 1422, the samples are soaked overnight. In block 1424, the samples are flooded with $D_2O$ brine. Then, a second treatment NMR is performed in block 1426. In block 1428, gas is injected into the samples. In block 1430, a third pre-treatment NMR is conducted. Foam is injected into the samples in block 1432. A $D_2O$ brine waterflood is conducted until oil production is negligible in block 1434. A fourth treatment NMR is performed in block 1436.

(3) Post-Coreflood Process

Figure 15:
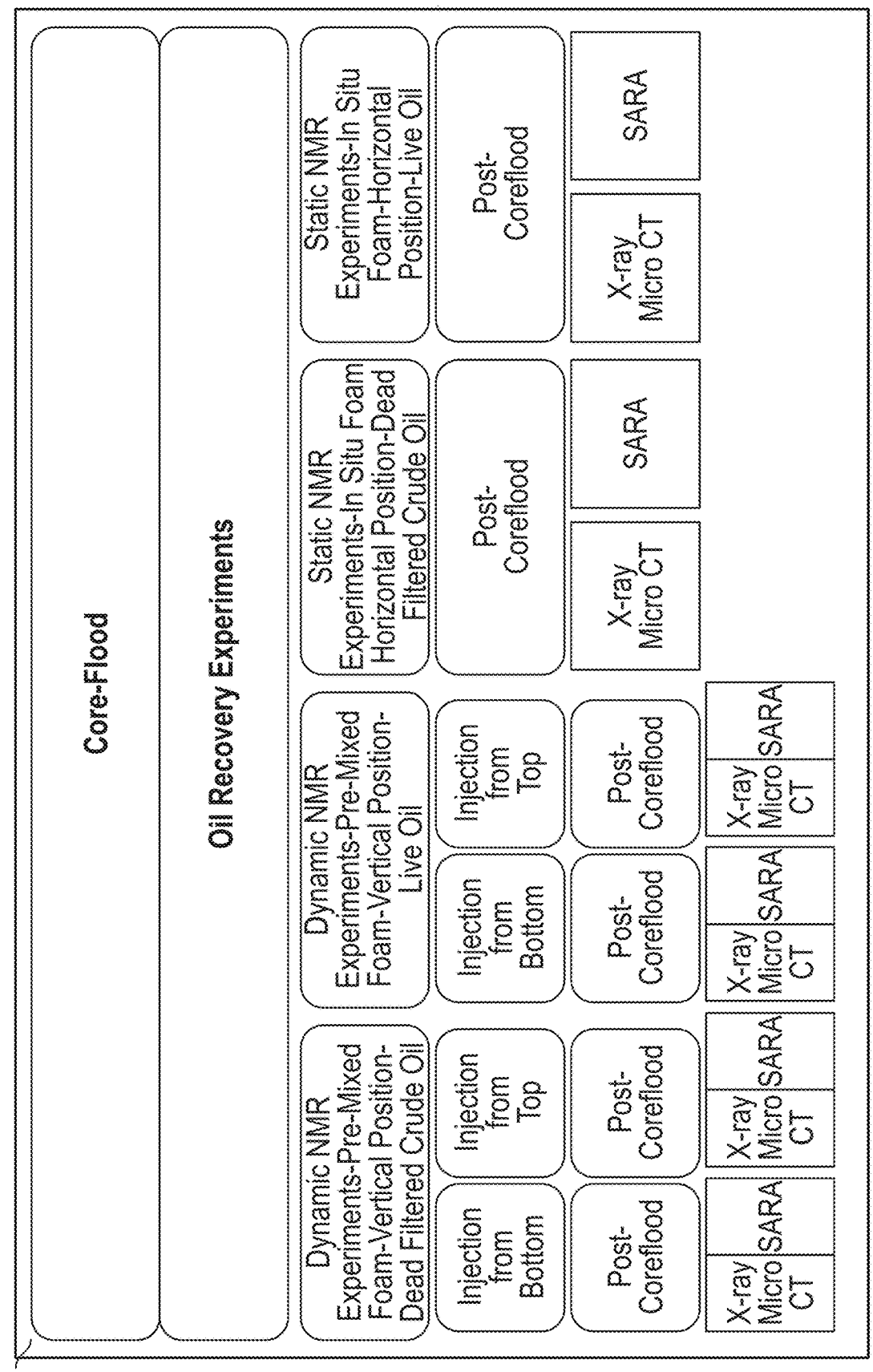
FIG. 15 illustrates post-coreflood processes according to one or more embodiments of the present disclosure.

As shown in FIG. 15, post-coreflood tests are conducted when the prior test is completed. There are at least two types of post-coreflood tests that may be conducted: X-ray micro-CT scans and SARA (Saturate, Aromatic, Resin and Asphaltene) analysis of the effluent oil. X-ray micro-CT scans may be conducted to reduce uncertainty in fluid distributions from NMR tests, since NMR T2 and brine profile tests do not provide three-dimensional (3D) imaging capabilities. Additionally, since many of the commercial $D_2O$ can have impurities, the X-ray micro-CT scans reduce uncertainty in the NMR tests.

SARA Analysis may be used to determine the changes in the oil composition following gel and foam treatment in the oil recovery experiments. Since crude oil is composed of different components, brine salinity and surfactant in the foam composition may alter rock wettability and oil composition during coreflood. Moreover, the trapped and mobile oil may have different compositions which might affect the crude oil response (1H response) in NMR tests during coreflood.

Co-injection of foam and gel, alternation of foam with gel, alternation of gel with foam, and/or co-generation of foam stabilized by gel extends the depth of reach and effectiveness and minimizes degradation. The method according to embodiments of the present disclosure ensures that what cannot be contacted or reached by foam will be contacted or reached by gel, making the displacement process more efficient. In the workflows described herein, injection at different vertical and horizontal directions is investigated to evaluate the impact of buoyancy on the conformance control treatment. Dynamic NMR measurements are included for close monitoring of the injectant flood front, or the distance travelled by the injected fluid. Furthermore, advanced post-coreflood measurements, such as X-ray micro-CT scans and SARA analysis of the effluent oil, are included to reduce the uncertainty in the NMR measurements. NMR scanning methods, such as 23Na+ NMR scanning, may be implemented to minimize uncertainty and improve data accuracy of coreflood.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures.

What is claimed is:

1. A method for evaluating oil recovery, comprising:
  performing a pre-coreflood process, comprising:
    preparing a plurality of heterogenous core samples having different structural configurations, the structural configurations comprising a sample with no fracture, a sample with a drilled wormhole, a sample with an artificial fracture, and a sample with an acid wash wormhole;
  following the pre-coreflood process, performing a coreflood process on one or more of the plurality of heterogeneous core samples, wherein the coreflood process comprises:
    injecting a treatment into each of the one or more of the plurality of heterogeneous core samples, resulting in a set of treated heterogeneous core samples,
    wherein the treatment is injected from one of a top or a bottom of each core sample followed by the other of the top or the bottom of each core sample;
    obtaining nuclear magnetic resonance (NMR) measurements of the set of treated heterogeneous core samples;
    comparing each of the NMR measurements to assess performance of the treatment on each of the plurality of heterogeneous core samples; and
    evaluating an effect of the treatment on oil and gas recovery in the set of treated heterogeneous core samples following the coreflood process, performing a post-coreflood process, wherein the post-coreflood process comprises:
    conducting at least one of a post-coreflood X-ray micro-computerized topography (CT) scan and a Saturate, Aromatic, Resin, and Asphaltene (SARA) analysis on the set of treated heterogeneous core samples.

2. The method of claim 1, wherein the plurality of heterogeneous core samples comprises a plurality of outcrop core-plugs.

3. The method of claim 1, wherein the treatment comprises co-injecting a foam and a gel.

4. The method of claim 1, wherein the treatment comprises alternate injecting of a foam and a gel.

5. The method of claim 1, wherein the treatment is injected in a vertical direction.

6. The method of claim 1, wherein the treatment is injected in a horizontal direction.

7. The method of claim 1, wherein the pre-coreflood process further comprises selecting a plurality of homogeneous cores from an outcrop or a reservoir of interest.

8. The method of claim 1, wherein the pre-coreflood process further comprises conducting a pre-coreflood X-ray micro-CT scan on at least one of the heterogeneous core samples prior to the coreflood process.

9. The method of claim 8, wherein the post-coreflood process comprises conducting the post-coreflood X-ray micro-CT scan, the method further comprising comparing the pre-coreflood X-ray micro-CT scan to the post-coreflood X-ray micro-CT scan.

10. The method of claim 1, wherein the post-coreflood process comprises conducting SARA analysis on effluent oil from the coreflood process.

11. The method of claim 1, further comprising determining and implementing a foam injection mode during the coreflood process.

12. The method of claim 1, wherein the NMR measurements comprise at least one of dynamic NMR measurements and static NMR measurements.

13. The method of claim 1, wherein the coreflood process further comprises evaluating at least one of foam stability and gel stability.

14. The method of claim 1, wherein evaluating the effect of the treatment comprises determining at least one of an original oil in core (OOIC) value, a remaining oil in core (ROIC) value, and an oil recovery by waterflooding (ORWF) value.

15. A method for evaluating oil recovery, comprising:
    preparing a plurality of heterogenous core samples having different structural configurations, the structural configurations comprising a sample with no fracture, a sample with a drilled wormhole, a sample with an artificial fracture, and a sample with an acid wash wormhole;
    injecting a treatment into each of the plurality of heterogeneous core samples, resulting in a set of treated heterogeneous core samples,
    wherein the treatment is injected from one of a top or a bottom of each core sample followed by the other of the top or the bottom of each core sample,
    wherein the treatment comprises alternately injecting a foam and a gel;
    obtaining nuclear magnetic resonance (NMR) measurements of the set of treated heterogeneous core samples;
    comparing each of the NMR measurements to assess performance of the treatment on each of the plurality of heterogeneous core samples;
    conducting X-ray micro-computerized topography (CT) scans on the set of treated heterogenous core samples; and
    evaluating an effect of the treatment on oil and gas recovery in the set of treated heterogeneous core samples.

16. The method of claim 15, wherein evaluating the effect of the treatment comprises determining at least one of an original oil in core (OOIC) value, a remaining oil in core (ROIC) value, and an oil recovery by waterflooding (ORWF) value.

* * * * *